(12) United States Patent
Kim

(10) Patent No.: US 6,953,541 B2
(45) Date of Patent: Oct. 11, 2005

(54) FLEXIBLE POLYOLEFIN COMPOUNDS FOR VEHICLE APPLICATIONS

(75) Inventor: Sehyun Kim, Murrysville, PA (US)

(73) Assignee: Sunoco Inc. (R&M), Philadelphia, PA (US)

( * ) Notice: Subject to any disclaimer, the term of this patent is extended or adjusted under 35 U.S.C. 154(b) by 479 days.

(21) Appl. No.: 09/825,585

(22) Filed: Apr. 4, 2001

(65) Prior Publication Data

US 2003/0022952 A1 Jan. 30, 2003

(51) Int. Cl.$^7$ .......................... C08L 77/00; B29C 47/00
(52) U.S. Cl. ............... 264/141; 264/176.1; 264/177.17; 264/177.2; 264/211; 264/211.12; 264/211.21; 264/211.23; 524/169; 524/271; 524/274; 524/317; 524/514; 525/58; 525/60; 525/166; 525/179; 525/184
(58) Field of Search .............................. 525/184, 179, 525/58, 60, 166; 524/169, 317, 271, 274, 514; 264/141, 176.1, 177.17, 177.2, 211, 211.12, 211.21, 211.23

(56) References Cited

U.S. PATENT DOCUMENTS

| | | | | |
|---|---|---|---|---|
| 4,029,839 | A | 6/1977 | Lesti | 428/306 |
| 4,663,103 | A | 5/1987 | McCullough et al. | 264/40.4 |
| 4,968,463 | A | 11/1990 | Levasseur | 264/40 |
| 5,290,886 | A | 3/1994 | Ellul | 524/515 |
| 5,294,384 | A | 3/1994 | David et al. | 264/37 |
| 5,397,832 | A | 3/1995 | Ellul | 524/515 |
| 5,498,667 | A | 3/1996 | David et al. | 525/166 |
| 5,591,802 | A | 1/1997 | David et al. | 525/66 |
| 5,681,952 | A | 10/1997 | Sifniades et al. | 540/540 |
| 5,719,198 | A | 2/1998 | Young et al. | 521/40.5 |
| 5,728,741 | A | 3/1998 | Zegler et al. | 521/40 |
| 5,852,115 | A | 12/1998 | Young et al. | 525/64 |
| 5,859,071 | A | 1/1999 | Young et al. | 521/40.5 |
| 5,883,020 | A | 3/1999 | Bargo et al. | 442/168 |
| 5,889,142 | A | 3/1999 | Mohajer et al. | 528/480 |
| 5,929,234 | A | 7/1999 | Sifniades et al. | 540/540 |
| 5,932,724 | A | 8/1999 | Sifniades et al. | 540/540 |
| 6,048,017 | A | 4/2000 | Doshi | 296/39.2 |
| 6,099,771 | A | 8/2000 | Hudkins et al. | 264/102 |
| 6,099,775 | A | 8/2000 | Bargo et al. | 264/122 |
| 6,207,754 | B1 | * 3/2001 | Yu | 525/133 |
| 6,228,479 | B1 | * 5/2001 | Zegler et al. | 428/327 |
| 6,306,318 | B1 | * 10/2001 | Ricciardelli et al. | 264/37.32 |

* cited by examiner

*Primary Examiner*—Ana Woodward
(74) *Attorney, Agent, or Firm*—John K. Abokhair; Roberts, Abokhair & Mardula, LLC

(57) ABSTRACT

The present invention provides a method for preparing flexible thermoplastic compositions that may be used separately or combined with up to fifty percent thermoplastic scrap. One embodiment of the invention comprises creating a melt-blend of blending composition, up to 50% by weight thermoplastic scrap and up to 15% by weight poly(ethyl-co-vinyl) acetate wherein the blending composition comprises an impact polypropylene, impact modifier and plasticizer. The polypropylene, impact modifier and plasticizer are selected to meet requirements of flexible thermoplastic compositions useful in vehicle interiors. In another embodiment of the invention a random polypropylene is used.

26 Claims, No Drawings

FLEXIBLE POLYOLEFIN COMPOUNDS FOR VEHICLE APPLICATIONS

This application is a Request for Continued Examination (RCE) of U.S. patent application Ser. No. 09/420,002, filed Apr. 4, 2001.

BACKGROUND OF THE INVENTION

The invention relates to a flexible polyolefin compound for use in floor coverings or upholstery where a low gloss, highly flexible, soft and thermoformable material is desired. The invention is particularly useful for vehicle floor covering made with recycled and reclaimed waste polymeric material.

There has been an increased interest in recycling, reclaiming and reutilizing waste and scrap material, and particularly waste thermoplastic polymeric material obtained from a variety of sources. This is partly due to increasing costs of storage and/or landfill space and more stringent regulations for disposal or incineration.

The vehicle manufacturers have aggressively participated in recycling efforts. For example, Ford Motor established its Recycling Action Team in 1991 to find ways to increase the use of recycled materials in its vehicle manufacturing. Outcomes of this program include Visteon Automotive Systems' recycling of thermoplastic scrap from automobile bumpers and E.I. Dupont's recycling of scrap into automobile air cleaners.

The recycling of most mixtures of thermoplastic scrap material is limited by the incompatibility of the various different kinds of thermoplastic material present in the scrap. For example, the various thermoplastic resins are often insoluble in each other resulting in a heterogeneous mixture in which each type of resin forms a dispersed phase in the other. This often results in adversely affecting the mechanical properties (e.g., tensile and impact strength) and aesthetic properties of any articles formed from such a mixture.

Processes for recycling floor covering scrap are desired inasmuch as a particularly large amount of scrap material is generated during the manufacture and installation of floor covering. For example, during installation of automotive interior carpet, a quantity of carpet remnant is generated as the carpet is formed and cut into various irregular shapes. As a result, millions of pounds of thermoplastic scrap waste are generated every year as part of the automobile manufacturing process. Similarly, installation of residential or commercial floor coverings generates comparable waste sources.

Typical floor covering scrap contains polyamides (for example nylon 6 and nylon 6,6), polyester, polypropylene, poly(ethylene-co-vinyl acetate), hereinafter EVA, and varying amounts of fillers such as $CaCO_3$ and $BaSO_4$. Each of the polymers has its own physical and chemical properties, and therefore different processing conditions. For example, ethylene-vinyl acetate copolymer (EVA) begins to degrade at 190°–200° C. releasing acetic acid in the process. Since EVA is a major component of floor covering scrap, serious consideration must be given to the processing temperature. Polypropylene has a melt temperature of about 165° C. while the polyamide nylon 6,6 has a melt temperature of 265° C. To prepare blends of EVA and polypropylene materials, one would ideally operate between about 210° C. and 230° C.; however, EVA degradation may prevent operation at such high temperature.

Other attempts have been made to recycle the thermoplastic compounds found in floor coverings. U.S. Pat. Nos. 6,099,775 and 5,883,020 to Bargo et al, uses 1 to 30% of such thermoplastic scrap in the formation of insulation (thermoplastic scrap containing nylon fibers and other materials such as ethylene-vinyl acetate, polyvinyl chloride, or polypropylene). The Bargo application mixes scrap with fiberized glass fibers and phenolic resins to form an insulation material. Other resins such as epoxy resins, vinyl esters, and urethane silicones may also be utilized. U.S. Pat. No. 4,029,839 to Lesti also discloses the use of thermoplastic scrap in the formation of insulation products.

U.S. patents to Sifniades et al (U.S. Pat. Nos. 5,932,724; 5,929,234 and 5,681,952) teach depolymerization techniques for obtaining caprolactum from the nylon contained in thermoplastic scrap.

U.S. Pat. No. 4,968,463 to Levasseur proposes shredding or granulating polymeric waste, drying the material to a water content of not more than 8% by weight, preheating the material to a temperature of 80.degree. C. to 160.degree. C., kneading at a temperature of 120.degree. to 250.degree. C. and injection molding or extrusion of the material to form a product such as a fence post.

U.S. Pat. No. 5,889,142 to Mohajer et al. discloses the recovery of polyamide from the nylon contained in thermoplastic scrap. The recovered polyamide is then available for feedstock in new nylon fiber manufacture.

U.S. Pat. No. 5,728,741 to Zegler et al. discloses the use of thermoplastic scrap in the form of automotive carpet scrap in the manufacture of compositions useful as floor coverings, particularly the secondary backing used in carpet manufacture. Similarly, U.S. Pat. No. 4,663,103 to McCullough et al. also discloses a method of processing such scrap into carpet backing.

U.S. patents to David et al. (U.S. Pat. Nos. 5,591,802; 5,498,667 and 5,294,384) create a thermoplastic product by forming a melt blend from thermoplastic scrap at a temperature of 250° C. to 260° C. The thermoplastic product is typically pelletized and used as a raw material in other products. The David patents disclose that additional polymers can be added to the melt blend but do not teach how a particular polymer will meet product specifications.

U.S. patents to Young, et al (U.S. Pat. Nos. 5,859,071; 5,852,115 and 5,719,198) also disclose preparing products from a melt blend using thermoplastic scrap and polymers, particularly ethylene-co-vinyl acetates. Resultant compositions are indicated as being useful as general-purpose commodity thermoplastics. These patents also disclose the addition of polypropylene in amounts of 1% to 10% to the melt blend in order to create a "rigid" material.

However, in contrast to rigid materials, it is desirable to create flexible thermoplastics comprised of recycled thermoplastic scrap and polypropylene for use in vehicles to satisfy preferences for recycled compositions. Such thermoplastics are useful for interior coverings such as floor coverings and dashboards as well as exterior uses such as truck bed liners. For example, U.S. Pat. No. 6,099,771 to Hudkins, et al. discloses a method of creating floor mats for automobiles.

Vehicle manufacturers set a number of requirements that suppliers of thermoplastic materials must satisfy. The Hudkins patent discloses the requirement that automobile parts should have a high quality surface finish described as "Class A" that is free of imperfections. In addition, vehicle interiors can attain elevated temperatures due to sunlight transmission into an unventilated interior. Thermoplastic compositions used in such environments must be thermally stable yet not release excessive levels of compounds that can condense on interior surfaces such as windows.

Accordingly, there is a need in the industry for thermoplastic compositions comprised of a blending stock that can combine with thermoplastic recycle scrap available from such sources as floor coverings. Additionally, there is a need for thermoplastic compositions comprising recycle scrap where such compositions are useful in vehicle applications. Such needs for recycling are not limited to vehicle applications and would also apply to any industry that may utilize such resultant compositions.

BRIEF SUMMARY OF THE INVENTION

It is an object of the present invention to prepare flexible thermoplastic compositions which may be used separately or combined with up to fifty percent thermoplastic scrap.

It is a further object of the present invention to prepare flexible thermoplastic composition useful as upholstery or floor covering materials in vehicle manufacture.

One embodiment of the invention comprises creating a melt-blend of blending composition, up to 50% by weight thermoplastic scrap and up to 15% by weight poly(ethyl-co-vinyl) acetate wherein the blending composition comprises an impact polypropylene, impact modifier and plasticizer. The polypropylene, impact modifier and plasticizer are selected to meet requirements of flexible thermoplastic compositions useful in vehicle interiors. In another embodiment of the invention a random polypropylene is used.

DETAILED DESCRIPTION OF THE INVENTION

This invention produces a relatively low gloss, highly flexible, soft and thermoformable material suitable for vehicle floor covering that additionally incorporates recycled and reclaimed waste polymeric material.

Normally in developing compositions incorporating recycled waste materials, as much of the recycle scrap as possible should be used in the commercial application. However, in order to maintain the desired physical properties of the final product, it has been preferred to use not more than 50% of the recycled stock. In most applications, physical properties requirements limit the recycle stock to not more than 45% by weight of the final product.

Ethylene vinyl acetate (EVA) is also added to the composition. The EVA is thought to improve blending of the various thermoplastic components in the recycle stock as well as improving impact strength, elongation, and flow characteristics of the final compositions. EVA can be either anhydride modified or unmodified. Typical anhydride modified EVA is available under the trademark "Bynel" from E. I. Dupont de Nemours. Unmodified EVA is also available from E. I. Dupont de Nemours under the "Elvax" trademark.

For the purposes of this application, the following terms are utilized as described below. "Recycle" stock, composition, product or scrap shall mean the plastic composition made from the recycled and reclaimed thermoplastic scrap including any additives added thereto. "Blending" composition, product or stock shall mean the polyolefin composition (various components) added to the recycle stock. The "melt-blended" product or composition is the final product comprising recycle stock, blending stock, EVA and any other additives where applicable. In a typical embodiment, the melt-blend product is created by co-extruding recycle stock, blending composition and EVA through a co-rotating, twin screw extruder.

The target properties for the final melt-blended composition useful in vehicle upholstery or floor covering applications are shown. Additionally, one proposed blending composition (BC-1) properties are also shown. The target properties for the blended or final product are included. The results of the blend of BC-1 and the recycle material are shown. The BC-1 composition comprised polypropylene/impact modifier/plasticizer in a ratio of 60/30/10. The properties of the BC-1 components are shown in Table II below.

TABLE I

Properties Blending Materials and Blended Products

|  | Blending Comp. | Initial target for Blending Comp. | Target Blended Product | Melt-Blend Trial -1 | remarks |
|---|---|---|---|---|---|
| % wt BC-1 | 100 |  |  | 45 |  |
| % wt Target Blending Composition |  | 100 | 45 |  |  |
| % wt Recycle Stock |  |  | 45 | 45 |  |
| % wt Modified EVA - Bynel CXA ® E361 properties |  |  | 10 | 10 |  |
| Melt Flow Rate (g/10 min) @ 230° C. | 18.2 | 0.6 | 0.6 | 11.7 |  |
| Izod notch test (J/m) | 671 | 438 | 450 | 283 | Trial-1 value too low |
| Tensile Strength (psi) | 2436 | 1349 | 1378 | 1146 |  |
| Elongation @ break (%) | 825 | 800 | 690 | 132 | Trial-1 value too low |

TABLE I-continued

Properties Blending Materials and Blended Products

| | Blending Comp. | Initial target for Blending Comp. | Target Blended Product | Melt-Blend Trial -1 | remarks |
|---|---|---|---|---|---|
| Flexural Modulus (kpsi) | 46.5 | 11.6 | 20 | 34.7 | Trial-1 value too high |
| Hardness (Shore D) | 54 | 41 | 43 | 49 | |
| Vicat (° C.) | 95.6 | 63 | 58 | 72 | |
| Fog (% transmission) | — | 99 | >70 | 38 | Trial-1 value too low |

In addition to the above target properties, the following properties are also important to the vehicle upholstery applications. The melt-blend product should be flexible but thermoformable. When thermoformed into a sheet, the resultant sheet should not be oily, sticky or very glossy.

TABLE II

Materials employed in BC-1 Blending Composition

| | Polypropylene | Impact Modifier | Plasticizer |
|---|---|---|---|
| Percent by Weight in the Blending Composition | 60 | 30 | 10 |
| Tradename | | Engage | Indopol |
| Grade | Ti4110 | 8200 | H-40 |
| manufacturer | Aristech Chemical Corporation | Dupont Dow Elastomers LLC | BP Amoco Group |
| Remarks | impact polypropylene | polyolefin elastomer | polybutene |

The following testing methods are used to determine properties of compositions:

Melt Flow Rate—ASTM 1238 test method determines melt flow rate at 230° C. with 2.16 Kilograms weight.

Notched Izod Impac—ASTM D256-97 test method for testing impact resistance of plastics.

Tensile Strength—ASTM D638 test method using Type I tensile bars. The tensile bars are molded on a Cincinnati Milacron 55-ton injection molding machine. Five tensile bars per each blend are then tested using Sintech 6 Universal tester under condition prescribed in ASTM D638: 2 inches per minute crosshead speed; 2 inch 50 percent extensometer. The dimensions of the straight portion of the specimen are 0.125 inch by 0.5 inch. The initial jaw separation is 4.5 inches.

Elongation at break—ASTM D638 test method. The ultimate elongation of a plastic is the percentage increase in length that occurs before it breaks under tension. Samples are placed in a tensile testing machine.

Flexural Modulus—ASTM D790 test method. Five injected molded tensile bars per each blend are tested using a Sintech 6 or Sintech 10/GL Universal tester under condition prescribed in ASTM D790: 0.375 inch radius of nose and supports; 0.05 inch/minute test speed; 2 inch span.

Hardness—ASTM D2240 test method. Durometers are used which are calibrated to the Shore scale.

Vicat Softening point—ASTM D1525 test method. Test determines temperature at which a specified needle penetration occurs.

Fog % transmission—Three injection molded discs are prepared from each blend. They are then heated to 100° C. in the presence of a glass plate held at 21° C. The light transmission through the glass plate is then measured. When volatiles and the like exist in the molded discs, the volatiles evaporate and deposit onto the glass surface and decrease the percent transmission. In addition to the transmission value, if visible droplets or an oily film form on the glass then the test is failed.

As given in Table I, the melt blend trial-1 material does not provide comparable properties to the targeted properties. One of the critical characteristics in this application is the fog test. Vehicle manufacturers set fog % transmission levels for thermoplastics being used in vehicle interiors. For example, instrument panels and dashboards may require a fog level of 85% while flooring and floor mats may require a fog level of 60%.

An initial target value of 70% fog transmission was used set for this invention.

Experimental work was conducted in an attempt to improve fundamental understanding of structure-processing-property relationships in these compositions.

The materials employed in this study have the characteristics as given in Tables III, IV and V:

TABLE III

Characteristics of Polypropylene Materials

| Grade | Ti4119GN | Ti4007G | TR3005J |
|---|---|---|---|
| Manufacturer | Aristech Chemical Corp. | Aristech Chemical Corp. | Aristech Chemical Corp. |
| % Ethylene | 11.4–14.5 | 5–6 | 2–3 |
| Melt Flow Rate (g/10 min) @ 230° C. | 12 | 0.7 | 0.5 |
| Tensile Strength (psi) @ yield | 3680 | 4000 | 4000 |
| Flexural Modulus (kpsi) | 169 | 160 | 160 |
| Hardness (Shore D) | 63 | — | — |
| Remarks | impact polypropylene containing 7.5% high density polyethylene | impact polypropylene | random polypropylene |

TABLE IV

Characteristics of Impact Modifier Materials

| | Engage 8200 | Engage 8180 | DFDB 1085 | DFDB 1088 | Royalene 7200 | CA12A |
|---|---|---|---|---|---|---|
| manufacturer | DuPont Dow Elastomers | DuPont Dow Elastomers | Union Carbide Corp. | Union Carbide Corp. | Uniroyal | Montell |
| composition | $C_2$–$C_8$ | $C_2$–$C_8$ | $C_2$–$C_4$ | $C_2$–$C_4$ | $C_2$–$C_3$–$C_{12}$ | $C_2$–$C_3$ |
| catalyst | SS[a] | SS[a] | ZN[b] | ZN[b] | ZN[b] | ZN[b] |
| Specific Gravity | 0.87 | 0.863 | 0.884 | 0.884 | 0.87 | — |
| Melt Flow Rate (g/10 min) @ 230° C. | 10 | 1 | 2 | <1 | <1 | <1.0 |
| Mooney Viscosity ML(1 + 4) @ 125° C. | 8 | 35 | 30 | 40 | 50 | — |
| Hardness (Shore A) | 75 | 66 | 77 | 80 | — | — |
| % Ethylene | 75 | 75 | 75 | 75 | 75 | 40 |
| Flexural Modulus (kpsi) | — | — | 3.5 | 3.5 | — | — |

[a] single site catalyst
[b] Ziegler-Natta catalyst

TABLE V

Characteristics of Plasticizer Materials

| Manufacturer | Grade | Remarks |
|---|---|---|
| Aristech Chemical Corp. | Process Oil | $C_8$–$C_{12}$ refinery hydrocarbons |
| Aristech Chemical Corp. | PX-111 + 0.1% Topanol | diundecyl phthalate |
| Aristech Chemical Corp. | PX-338 | tri-2-ethylhexyl trimellitate |
| Arco | Arcoprime | food grade mineral oil |
| C. P. Hall | Plasthall BSA | n,n-butylbenzene sulfonamide |
| C. P. Hall | Plasthall 100 | iso-octyl tallate |
| C. P. Hall | Plasthall 503 | n-butyl tallate |
| C. P. Hall | Plasthall R-9 | octyl tallate |
| C. P. Hall | Plasthall 7049 | alkyl (higher than $C_8$) tallate |
| C. P. Hall | Plasthall ESO | epoxidized soybean oil |

The various compounds prepared during the experimental work were prepared utilizing Werner-Pfleiderer ZSK-30 co-rotating twin screw extruder (L/D=44). The extruder had multiple transport and mixing zones, but with a single kneading zone. Blending compositions were prepared by feeding the polypropylene and impact modifiers to the feed zone. When used, plasticizer was fed into a transport zone downstream of the kneading zone but upstream of two of the five mixing zones.

As identified in Table I, the melt blend Trial-1 material did not provide the target properties. It was determined that an impact modifier is needed for the polypropylene products in order to obtain a flexural modulus of 20,000 psi or lower. Various impact-modifiers were incorporated into Ti4119GN at various levels. Table VI gives the formulations and properties determined on the injection molded bars. In general the impact modifiers comprised olefin copolymers such as the low density polyethylenes DFDB 1085 and DFDB 1088 available from Union Carbide Chemical or terpolymers of ethylene, propylene and a non-conjugated diene such as Royalene EPDM 7200 from Uniroyal.

TABLE VI

Effects of Impact Modifier on Blending Composition

| | Test 2-1 | Test 2-2 | Test 2-3 | Test 2-4 | Test 2-5 | Test 2-6 | Test 2-7 | Test 2-8 | Test 3-1 | Test 3-2 |
|---|---|---|---|---|---|---|---|---|---|---|
| % wt Ti4119GN | 100 | 85 | 70 | 70 | 60 | 60 | 60 | 60 | 40 | 40 |
| % wt Engage 8200 | | 15 | 30 | | | | | | | |
| % wt Engage 8180 | | | | 30 | 40 | | | 60 | | |
| % wt CA12A | | | | | | 40 | | | | |
| % wt DFDB1085 | | | | | | | 40 | | | 60 |
| % wt Royalene 7200 | | | | | | | | 40 | | |
| MFR[a] | 11.5 | 11.3 | 11.2 | 6.8 | 6.2 | 3.7 | 6.5 | 3 | 3.1 | 2.7 |
| TS[b] (psi) | 3680 | 3040 | 2340 | 2220 | 2070 | 2500 | 1870 | 1790 | — | — |
| FM[c] (kpsi) | 169 | 130 | 90 | 88 | 81 | 116 | 76 | 72 | 36.4 | 41.2 |
| Shore D[d] | 63 | 62 | 54 | 53 | 50 | 60 | 51 | 52 | 37 | 37 |

[a]Melt Flow Rate - g/10 min @ 230° C.; [b]Tensile Strength; [c]Flexural Modulus; [d]Hardness The results indicate that melt flow rate decreases with increasing amounts of impact-modifier. Similarly, tensile strength, flexural modulus and hardness decrease with increasing amounts of impact-modifier. Similar results were obtained with Engage, DFDB, or Royalene impact modifiers. Lower results were obtained with the Montell impact modifier.

These results indicate that in order to obtain the desired flexibility and hardness via compounding, at least 60% impact modifier is required. Since such an amount of modifier is, however, very costly to accommodate, it was concluded that addition of plasticizer is required.

The addition of some amounts of plasticizer into polymers makes the polymer soft and/or flexible. A plasticizer for polyolefins is, however, not known to date. Please see WO 9844041 (Upfloor Oy, Nokia, Fin, Oct. 8, 1998), U.S. Pat. No. 5,290,886 and U.S. Pat. No. 5,397,832 for a discussion on plasticizers. These references are incorporated herein in their entirety for the purposes of US prosecution. Process oil and mineral oil were first studied for potential use as a plasticizer with both DFDB 1085 and Engage 8180 impact modifiers. An impact copolymer, Ti4007G (melt flow rate of 1) was employed as a base polypropylene instead of Ti4119GN (melt flow rate of 12) to obtain relatively low melt flow rate of the final compound. Effects of oils on flexural modulus and melt flow rate have been tabulated in Table VII.

TABLE VII

Effect of Mineral oil (Arcoprime) and Process Oil as Plasticizer

| | Test 6-1 | Test 6-2 | Test 10-1 | Test 6-3 | Test 6-5 | Test 6-6 | Test 6-7 |
|---|---|---|---|---|---|---|---|
| % wt Ti4007G | 60 | 50 | 45 | 40 | 50 | 40 | 60 |
| % wt Engage 8180 | 40 | 40 | 40 | 40 | | | |
| % wt DFDB 1085 | | | | | 40 | 40 | 40 |
| % wt Process oil | | | | | 10 | | |
| % wt Arcoprime Oil | | 10 | 15 | 20 | | 20 | |
| Melt flow rate g/10 min @ 230° C. | 1.2 | 3.8 | 3.5 | 7.0 | 4.2 | 6.9 | 1.1 |
| Flexural modulus (kPsi) | 70 | 34 | 26 | 22 | 38 | 26 | 74 |

As shown in Table VII, the flexural modulus decreases and melt flow rate increases with increasing amounts of oil used as plasticizer. Comparable results are obtained regardless of the oil or impact modifier used. At concentrations in excess of 10% by weight, the process oil test compositions have an oily/sticky residue which gives them unacceptable surface quality. The addition of 20% mineral oil as plasticizer exhibited a comparable flexural modulus (22–26 kpsi) to the target value (20 kpsi) for a blending composition. Thus, the material (Test 6—6) was used to make a candidate material for further testing.

The properties of the resultant Test 6—6 melt-blend composition, compared to target values, are given in Table VIII. The results indicate that melt flow rate of the test compositions was significantly higher than target. This may cause a problem in thermoforming, because thermoforming requires relatively high melt viscosity (low melt flow rate). The flexural modulus of melt blend Trial-2 is comparable to target. However, the fog transmission value is still below target specification (>70%).

TABLE VIII

Properties of Melt-Blend with Test 6-6 Blending Composition

|  | Melt Blend Trial-2 | Target Blended Product |
| --- | --- | --- |
| Test 6-6 Blending Composition[a] | 45 |  |
| Blending Composition Target |  | 45 |
| Recycle Stock | 45 | 45 |
| Modified EVA - Bynel CXA ® E361 | 10 | 10 |
| Melt Flow Rate (g/10 min) @ 230° C. | 6.1 | 0.8 |
| Flexural Modulus (kpsi) | 20.3 | 19.4 (15.7)[b] |
| Fog (% transmission) | 68 | 93 |

[a]40% Ti4007G/40% DFDB 1085/20% Arcoprime mineral oil
[b]determined by outside laboratory using Type IV test samples.

Gas chromatograph/mass spectrophotometer analysis was done on the residue deposited on the glass plate during the fog test. The residues are found to be various hydrocarbon compounds originating from Acroprime mineral oil. It was concluded that neither oil is an acceptable plasticizer (process oil left an unacceptable product surface and mineral oil failed fog transmission test). Prior testing similarly rejected polybutene as a plasticizer due to its failing the fog transmission test (polybutene grade Indopol® H-40 from Amoco was tested).

Alternative plasticizers that can meet fog requirement (>70% transmission) were sought. In U.S. Pat. No. 5,290,886 to Ellul, it has been reported that low molecular weight organic esters and alkyl ether esters act as plasticizers in polypropylene compositions. Various compounds containing such esters were prepared and evaluated in this study. Plasthall 100 and 503 are fatty acid esters and Plasthall BSA is an amide that is a known plasticizer for polyamides such as Nylon. Since the final melt-blend product is blended with recycle stock that has Nylon as a major component, Plasthall BSA was chosen in hope that it would provide plasticization to the final formulation. Based on the results of the formulations containing oil, the plasticizer level was kept to 15%. The formulations and properties are given in Table IX.

The results show that the effect of Plasthall plasticizers on melt flow rate is comparable to that of Arcoprime mineral oil at a given level. When impact modifier DFDB 1088 was employed instead of DFDB 1085, melt flow rate was lower. At 15 wt %, higher flexural modulus was obtained by using Plasthall for the plasticizer (29–34 kpsi) as compared to Arcoprime mineral oil (26 kpsi).

Although Plasthall series of plasticizers appear to be less effective to decrease the flexural modulus of the compound, the surface of the molded part was very smooth and soft, and no oily residue was detected.

TABLE IX

Blending Compositions Containing Monoesters as Plasticizer

|  | Test 10-2 | Test 10-4 | Test 10-5 | Test 12-3 |
| --- | --- | --- | --- | --- |
| % wt Ti4007G | 45 | 45 | 45 | 45 |
| % wt Engage 8180 | 40 |  |  |  |
| % wt DFDB 1085 |  | 40 | 40 |  |

TABLE IX-continued

Blending Compositions Containing Monoesters as Plasticizer

|  | Test 10-2 | Test 10-4 | Test 10-5 | Test 12-3 |
| --- | --- | --- | --- | --- |
| % wt DFDB 1088 |  |  |  | 40 |
| % wt Plasthall 100 | 10 | 10 |  |  |
| % wt Plasthall 503 |  |  | 15 | 15 |
| % wt Plasthall BSA | 5 | 5 |  |  |
| Melt Flow Rate (g/10 min) @ 230° C. | 3.7 | 3.4 | 3.2 | 2.2 |
| Flexural Modulus (kpsi) | 29 | 34 | 29 | 44 |

In order to evaluate the properties of the proposed formulation, these compounds were blended according Table X.

TABLE X

Properties of Melt Blend Trial-3 Based on Blending Compositions Containing Monoesters as Plasticizer

|  | Test 10-7 | Test 10-8 | Test 12-4 |
| --- | --- | --- | --- |
| wt % Blending Composition from Test 10-4[a] | 45 |  |  |
| wt % Blending Composition from Test 10-5[b] |  | 45 |  |
| wt % Blending Composition from Test 12-3[c] |  |  | 45 |

TABLE X-continued

Properties of Melt Blend Trial-3 Based on Blending Compositions Containing Monoesters as Plasticizer

|  | Test 10-7 | Test 10-8 | Test 12-4 |
|---|---|---|---|
| wt % Recycle Stock | 45 | 45 | 45 |
| wt % Modified EVA-Bynel CXA ® E361 | 10 | 10 | 10 |
| Melt Flow Rate (g/10 min) @ 230° C. | 3.8 | 3.3 | 2.0 |
| Flexural Modulus (kpsi) | 46 | 23 | 24 |
| Fog (% transmission) | 17 | 71 | 97[d] |

[a]45% Ti4007G/40% DFDB 1085/10% Plasthall 100/5% Plasthall BSA
[b]45% Ti4007G/40% DFDB 1085/15% Plasthall 100
[c]45% Ti4007G/40% DFDB 1088/15% Plasthall
[d]The discs were molded at independent laboratory.

As given in Table X, the compound containing Plasthall 100 and BSA showed poor fog value and higher flexural modulus, while the compound containing Plasthall 503 has comparable flexural modulus to the target blend and acceptable fog value (>70%). When molded and tested, the compound containing Plasthall 503 show particularly good fog transmission (97%).

After testing the above material in a small quantity (25 lbs.), 2000 pounds were compounded for a larger trial. Two thousand pounds of blending composition per Test 10-5 (45% Ti4007G/40% DFDB 1085/15% Plasthall 503) was prepared and 1/16" thick sheet of upholstery was extruded. The material ran well with good performance and feel of the surface of the sheet, however, smoke generation during extrusion was noted. The source of smoke generation was identified to the plasticizer.

Further study was undertaken to reduce smoke generation by plasticizer selection. The objective was to find an alternative plasticizer that does not smoke during extrusion, but provides characteristics comparable to Plasthall 503. Additional test methods employed include thermal gravimetric analysis and differential scanning calorimetry.

TGA (Thermal Gravimetric Analysis): The thermal stability of plasticizers was determined by TGA utilizing TA Hi-Res TGA 2950. The "Calcium Oxalate" method was used. Forty to 92-mg plasticizers in a ceramic sample pan was heated to 850° C. under air at the rate of 20° C./min while recording weight loss of the plasticizer.

DSC (Differential Scanning Calorimetry): The thermal characteristics were determined by annealed DSC utilizing TA Auto DSC 2920. Five to ten milligrams polymer in an aluminum DSC pan was melted at 210° C. for 10 minutes, and then cooled to 50° C. at a rate of 10° C./min while recording a recrystallization exotherm, followed by heating to 190° C. at 15° C./min to record a melting endotherm.

Plasticizer thermal stability was first determined using thermal gravimetric analysis (TGA hereafter). Results of TGA weight loss are given in Table XI along with smoke rating judged during compounding. The higher the number for smoke rating, the more smoke came off during compounding (i.e. lower numbers are preferential).

TABLE XI

Plasticizer Degradation Temperature and Smoke Rating

| Weight loss | Degradation Temperature (° C.) at x % weight loss | | | | | Smoke Rating |
|---|---|---|---|---|---|---|
|  | 1% | 2.5% | 5% | 7.5% | 10% |  |
| Plasthall ESO | 296 | 320 | 339 | 353 | 365 | 3 |
| PX-338 | 278 | 294 | 306 | 316 | 324 | 1 |
| PX-111 | 272 | 286 | 297 | 305 | 310 | 2 |
| Plasthall 100 | 216 | 241 | 259 | 272 | 282 | 4 |
| Plasthall 7049 | 214 | 240 | 258 | 271 | 280 | 4 |
| Plasthall R-9 | 217 | 238 | 256 | 269 | 278 | 3 |
| Plasthall 503 | 199 | 218 | 233 | 244 | 253 | 5 |

These results indicate that the smoke rating appears to relate to the thermal stability of the plasticizer except for Plasthall ESO and Plasthall R-9. As shown in Table XI, Plasthall ESO is the most stable and Plasthall 503 the least stable (based on 2.5% degradation temperature). A typical extruder melt temperature range for polypropylene is 190–232° C. (375–450° F.). At 232° C. melt temperature, Plasthall 503 degrades about 5% whereas Plasthall 100, Plasthall R-9 and Plasthall 7049 degrade approximately 2%. The phthalates PX-338 and PX-111 and Plasthall ESO do not degrade at 232° C. These results suggest that Plasthall 503 should be used below 190° C. in order to maintain less than 1% degradation.

Blending compositions using the various plasticizers in combination with impact modifier DFDB 1085 and polypropylene Ti4007G prepared in the laboratory and their properties are given in Table XII. As a comparison, Table XIII shows properties for blending compositions with the various plasticizer Plasthall 503, DFDB 1085 impact modifier and polypropylene TR3005J.

The blending compositions containing phthalate plasticizers PX-111 and PX-338 were unacceptably oily, indicating incompatibility of the phthalate with polypropylene. This incompatibility is also reflected in the relatively lower impact phthalates have on melt flow rate and flexural modulus. Therefore, phthalates cannot be used in the blending compositions, despite TGA demonstrating that they are thermally stable.

TABLE XII

Blending Compositions with Various Plasticizers with Ti4007G Polypropylene

| | Test 19-2 | Test 18-1 | Test 18-2 | Test 18-3 | Test 18-4 | Test 18-5 | Test 18-6 | Test 18-8 | Test 18-9 | Test 18-10 |
|---|---|---|---|---|---|---|---|---|---|---|
| % wt Ti4007G | 100 | 45 | 45 | 45 | 45 | 45 | 45 | 45 | 50 | 45 |
| % wt DFDB 1085 | | 40 | 40 | 40 | 40 | 40 | 40 | 40 | 40 | 35 |
| % wt plasticizer | 0 | 15 | 15 | 15 | 15 | 15 | 15 | 15 | 10 | 20 |
| plasticizer grade | | PX-111 | PX-338 | Plasthall 503 | Plasthall 100 | Plasthall R-9 | Plasthall 7049 | Plasthall ESO | Plasthall 503 | Plasthall 503 |
| Degree of smoking | — | 2 | 1 | 5 | 4 | 3 | 4 | 3 | 5 | 5 |
| MFR[a] | 0.7 | 2.7 | 2.8 | 3.5 | 4.8 | 7.4 | 6.0 | 5.4 | 2.9 | 6.8 |
| TS[b] (psi) | 4030 | 1570 | 1440 | 1400 | 1260 | 1220 | 1260 | 1480 | 1680 | 1470 |
| FM[c] (kpsi) | 198 | 40.6 | 36.3 | 33.3 | 30 | 31.3 | 32.5 | 56 | 42.4 | 33.4 |
| Fog[d] | — | — | — | 94 | 75 | 70 | 90 | 99 | — | 89 |
| | — | — | — | fail[e] | pass | pass | pass | pass | — | fail[e] |

[a]Melt Flow Rate - g/10 min @ 230° C.; [b]Tensile Strength; [c]Flexural Modulus; [d]% transmission; [e]oily film

TABLE XIII

Comparable Blending Composition with TR3005J Polypropylene

| | Test 19-3 | Test 19-1 |
|---|---|---|
| % wt TR3005J | 45 | 100 |
| % wt DFDB 1085 | 40 | |
| % wt plasticizer | 15% | 0 |
| plasticizer grade | Plasthall 503 | |
| Degree of smoking | 5 | — |
| MFR[a] | 4.0 | 0.6 |
| TS[b] (psi) | 1330 | 4230 |
| FM[c] (kpsi) | 27.2 | 158 |
| Fog[d] | 95 | — |
| | pass | — |

[a]g/10 min, @ 230° C.; [b]Tensile Strength; [c]Flexural Modulus; [d]% transmission; [e]oily film Increasing the amount of plasticizer increases the melt flow rate and decreases the flexural modulus. For example, increasing the amount of Plasthall 503 from 10% to 20% increases the melt flow rate from 2.9 to 6.8 as shown in Table XII. It also decreases the flexural modulus from 42 to 33 kpsi, with the decrease occurring between 10% and 15% Plasthall 503.

Since the viscosity of each of tallate plasticizers is expected to be comparable with each other because of their chemical structures, their effects on MFR and flexural modulus are expected to be comparable, but some differences between samples are apparent as given in Table XII. Although a given amount of plasticizer was injected to the extruder during compounding particular, sample variation can be as high as 20% (for example, 18% instead of 15%).

The effect of these variations may explain differences in flexural modulus among the tallate based plasticizers but does not explain differences in melt flow rate. In addition, it appears that more of the epoxidized soybean oil plasticizer (Plasthall ESO) is required to obtain comparable flexural modulus.

Tables XII and XIII also give fog transmission test results. With increasing amounts of plasticizer, the fog value decreases: that is, less amount of light passes through the glass plate due to the deposit of evaporated chemical from the plasticizer employed in the formulation. All the compounds tested by the fog test in this study have met and/or exceed the target fog transmission value (>70%).

However, the compounds containing higher amounts of Plasthall 503 in Ti4007G failed because they formed an oily film on the glass surface after the fog transmission test. This did not occur when Plasthall 503 was compounded with TR3005J polypropylene and may be due to the lower crystallinity of the random polymer TR3005J.

In order to examine the thermal characteristics of the blending compositions, DSC was conducted. The DSC results are given in Table XIV. Since all the compounds contain 40% wt impact modifier (a $C_2$–$C_4$ copolymer) having some degree of crystallinity, they exhibit two recrystallization exotherms and two melting endotherms. It should be noted that the melting and recrystallization temperatures of TR3005J are 18 and 8° C., respectively, lower than those of T14007G although the ethylene content of TR3005J is lower than Ti4007G (2.5 vs. 6.5%). The reason is there are more defects in the TR3005J polymer chain because ethylene is randomly distributed.

TABLE XIV

Thermal Characteristics of Blending Compositions Determined by DSC

| | Test 19-2 | Test 18-1 | Test 18-2 | Test 18-3 | Test 18-4 | Test 18-5 | Test 18-6 | Test 18-8 | Test 18-9 | Test 18-10 | Test 19-3 | Test 19-1 |
|---|---|---|---|---|---|---|---|---|---|---|---|---|
| $T_m$(° C.)[a] | 163.7 | 159.6 | 160 | 158 | 157.3 | 157.2 | 157.8 | 161.3 | 159.8 | 156.2 | 140.4 | 146.2 |
| | | 116.4 | 116.9 | 115.5 | 115.5 | 115 | 115.6 | 116.8 | 116.4 | 114.6 | 115.9 | |
| $\Delta H_m$ (J/g)[b] | 101.8 | 57.7 | 54.3 | 56.2 | 53.6 | 55.5 | 56.2 | 55.8 | 61.3 | 56.0 | 54.7[e] | 93.7 |
| $T_c$ (° C.)[c] | 113 | 115.3 | 114.3 | 112.6 | 111.5 | 110.8 | 111.9 | 115.7 | 114.2 | 111.5 | 100.4 | 105.2 |
| | | 99.9 | 100 | 99.3 | 99.3 | 98.7 | 99.2 | 100.1 | 100.1 | 99 | | |
| $\Delta H_c$ (J/g)[d] | 88.5 | 43.4 | 41.0 | 43.3 | 40.9 | 42.1 | 42.9 | 42.0 | 46.6 | 44.4 | 41.1 | 81.1 |

[a]Melting temperatures - degree Centrigrade; [b]Heat of melting - joules/gram; [c]Recrystallization termperature - degree Centrigrade; [d]Heat of recrystallization - joules/gram; [e]uneven baseline It appears that smoking during compounding relates to degradation as well as vapor pressure of plasticizer. Which one is the dominating cause for smoking is not clear at this point. The phthalate plasticizers are thermally stable and non-smoking during compounding, but they can not be used in blending compositions due to the formation of oily film on the surface. The oily film is attributed to the incompatibility of phthalate with polypropylene.

The flexural modulus was less affected by epoxidized soybean oil plasticizer as compared to the tallate plasticizers. When using tallate based Plasthall 503 as a plasticizer, the compounding should be done at lower than 190° C. in order to reduce temperature degradation and smoking. As an alternate to Plasthall 503, Plasthall R-9 can be used as the plasticizer. It is more stable and produces less smoking during compounding.

Subsequent to all the above testing it has been determined that preferred embodiments for blending composition comprise impact modifier with either impact polypropylene and higher carbon group tallates plasticizer or random polypropylene with any of the tallate plasticizers. It was also found that the blending compositions are separately useful as upholstery material for vehicle interiors when not combined with thermoplastic scrap.

While the present invention has been described in the context of the preferred embodiments thereof, it will be readily apparent to those skilled in the art that other modifications and variations can be made therein without departing from the spirit or scope of the present invention. Accordingly, it is not intended that the present invention be limited to the specifics of the foregoing description of the preferred embodiment, but rather as being limited only by the scope of the invention as defined in the claims appended hereto.

What is claimed is:

1. A method for preparing high scrap recycle content flexible polyolefin compositions comprising:
   creating a melt blend comprised of 15% to 50% by weight thermoplastic scrap material, up to 15% by weight poly(ethylene-co-vinyl acetate) and the remainder of the melt blend comprised of a blending composition;
   wherein the melt blend is formed by feeding said components to a melt compounding extruder operating at sufficient temperature, residence time and screw configuration to produce a homogenous melt blend;
   solidifying said melt blend;
   wherein the blending composition is comprised of from 40% to 60% by weight polypropylene, at least 40% by weight impact modifier and up to 15% by weight plasticizer;
   wherein the polypropylene is an impact polypropylene polymer with 5 to 7 percent by weight attached ethylene chains;
   wherein the impact modifier is an olefin copolymer of ethylene;
   wherein the plasticizer is selected from the group of compositions consisting of, tri-2-ethylhexyl trimellitate, butylbenzene sulfonamide, epoxidized soybean oil, octyl tallate, butyl tallate, octyl tallate and alkyl tallate;
   wherein the thermoplastic scrap material comprises granulated blends comprised of between 12 and 35% by weight polyamide;
   wherein the thermoplastic scrap material comprises up to 3% by weight polyester;
   wherein the thermoplastic scrap material comprises up to 5% by weight polypropylene;
   wherein the thermoplastic scrap material comprises up to 15% by weight poly(ethylene-co-vinyl acetate); and
   wherein the thermoplastic scrap material comprises up to 75% by weight poly(ethylene-co-vinyl acetate) filled with inorganic compositions wherein said inorganic compositions are further comprised of $BaSO_4$ and $CaCO_3$ and;
   wherein the flexible polyolefin composition so produced comprises at least 16 percent by weight of the polypropylene.

2. The method of claim 1 wherein the impact modifier is selected from the group consisting of ethylene-butene copolymer and ethylene-octene copolymer.

3. The method of claim 1 wherein the plasticizer is selected from the group of plasticizers butylbenzene sulfonamide, epoxidized soybean oil, octyl tallate, butyl tallate, octyl tallate and alkyl tallate.

4. The method of claim 1 comprised from 40% to 50% by weight thermoplastic scrap, from 8% to 12% by weight poly(ethylene-co-vinyl acetate) and from 38% to 52% by weight blending composition.

5. The method of claim 1 wherein the flexible polyolefin composition is suitable for use in motor vehicle interiors.

6. The method of claim 1 wherein the flexible polyolefin composition is suitable for use in automotive products requiring a Class A finish.

7. The method of claim 1 wherein the flexible polyolefin composition has a flexural modulus from 15,000 to 38,000 psi.

8. The method of claim 1 wherein the compounding melt extruder is a co-rotating twin screw extruder containing transport zones, at least one kneading zone, and at least three mixing zones.

9. The method of claim 8 wherein the plasticizer is added to the composition to an extruder transport zone situated subsequent to at least one mixing and kneading zones but prior to at least one mixing zone.

10. A method for preparing high scrap recycle content flexible polyolefin compositions comprising:
    creating a melt blend comprised of 15% to 50% by weight thermoplastic scrap material, up to 15% by weight poly(ethylene-co-vinyl acetate) and the remainder of the melt blend comprised of a blending composition;
    wherein the melt blend is formed by feeding said components to a melt compounding extruder operating at sufficient temperature, residence time and screw configuration to produce a homogenous melt blend;
    solidifying said melt blend;
    wherein the blending composition is comprised of from 40% to 60% by weight polypropylene, at least 40% by weight impact modifier and up to 15% by weight plasticizer;
    wherein the polypropylene is a random polypropylene with 2 to 3 percent by weight attached ethylene chains;
    wherein the impact modifier is an olefin copolymer of ethylene;
    wherein the plasticizer is selected from the group of compositions consisting of tri-2-ethylhexyl trimellitate, butylbenzene sulfonamide, epoxidized soybean oil, octyl tallate, butyl tallate, octyl tallate and alkyl tallate;
    wherein the thermoplastic scrap material comprises granulated blends comprised of between 12 and 35% by weight polyamide;
    wherein the thermoplastic scrap material comprises up to 3% by weight polyester;

wherein the thermoplastic scrap material comprises up to 5% by weight polypropylene;

wherein the thermoplastic scrap material comprises up to 15% by weight poly(ethylene-co-vinyl acetate);

wherein the thermoplastic scrap material comprises up to 75% by weight poly(ethylene-co-vinyl acetate) filled with inorganic compositions wherein said inorganic compositions are further comprised of $BaSO_4$ and $CaCO_3$ and;

wherein the flexible polyolefin composition so produced comprises at least 16 percent by weight of the polypropylene.

11. The method of claim 10 wherein the impact modifier is selected from the group consisting of ethylene-butene copolymer and ethylene-octene copolymer.

12. The method of claim 10 wherein the plasticizer is selected from the group of plasticizers butylbenzene sulfonamide, epoxidized soybean oil, octyl tallate, butyl tallate, octyl tallate and alkyl tallate.

13. The method of claim 10 comprised from 40% to 50% by weight thermoplastic scrap, from 8% to 12% by weight poly(ethylene-co-vinyl acetate) and from 38% to 52% by weight blending composition.

14. The method of claim 10 wherein the flexible polyolefin composition is suitable for use in motor vehicle interiors.

15. The method of claim 10 wherein the flexible polyolefin composition is suitable for use in automotive products requiring a Class A finish.

16. The method of claim 10 wherein the flexible polyolefin composition has a flexural modulus from 15,000 to 38,000 psi.

17. The method of claim 10 wherein the compounding melt extruder is a co-rotating twin screw extruder containing transport zones, at least one kneading zone, and at least three mixing zones.

18. The method of claim 17 wherein the plasticizer is added to the composition to an extruder transport zone situated subsequent to at least one mixing and kneading zones but prior to at least one mixing zone.

19. A method for preparing flexible polyolefin compositions comprising:

creating a melt blend comprised of a blending composition;

wherein the melt blend is formed by feeding said components to a melt compounding extruder operating at sufficient temperature, residence time and screw configuration to produce a homogenous melt blend;

solidifying said melt blend;

wherein the blending composition is comprised of from 40% to 60% by weight polypropylene, at least 40% by weight impact modifier and from 10% to 20% by weight plasticizer;

wherein the polypropylene is either a random polypropylene with from 2% to 3% by weight attached ethylene chains or an impact polypropylene with from 5% to 7% by weight attached ethylene chains;

wherein the impact modifier is an olefin copolymerof ethylene;

wherein the plasticizer is selected from the group of compositions consisting of tri-2-ethylhexyl trimellitate, butylbenzene sulfonamide, epoxidized soybean oil, octyl tallate, butyl tallate, octyl tallate and alkyl tallate.

20. The method of claim 19 wherein the impact modifier is selected from the group consisting of ethylene-butene copolymer and ethylene-octene copolymer.

21. The method of claim 19 wherein the plasticizer is selected from the group of plasticizers butylbenzene sulfonamide, epoxidized soybean oil, octyl tallate, butyl tallate, octyl tallate and alkyl tallate.

22. The method of claim 19 wherein the flexible polyolefin composition is suitable for use in motor vehicle interiors.

23. The method of claim 19 wherein the flexible polyolefin composition is suitable for use in automotive products requiring a Class A finish.

24. The method of claim 19 wherein the flexible polyolefin composition has a flexural modulus from 15,000 to 38,000 psi.

25. The method of claim 19 wherein the compounding melt extruder is a co-rotating twin screw extruder containing transport zones, at least one kneading zone, and at least three mixing zones.

26. The method of claim 25 wherein the plasticizer is added to the composition to an extruder transport zone situated subsequent to at least one mixing and kneading zones but prior to at least one mixing zone.

* * * * *

UNITED STATES PATENT AND TRADEMARK OFFICE
CERTIFICATE OF CORRECTION

PATENT NO. : 6,953,541 B2
DATED : October 11, 2005
INVENTOR(S) : Sehyun Kim and Edwin B. Townsend, IV It is certified that error appears in the above-identified patent and that said Letters Patent is hereby corrected as shown below:

Title page,
Item [75], Inventor, insert -- Edwin B. Townsend IV, Pittsburgh, PA (US) -- after "Sehyun Kim, Murrysville, PA (US)".

Signed and Sealed this

Twenty-eighth Day of February, 2006

JON W. DUDAS
*Director of the United States Patent and Trademark Office*